United States Patent [19]

Chesler

[11] 4,451,583

[45] May 29, 1984

[54] RECYCLING OF FLEXIBLE POLYURETHANE FOAM SCRAP

[75] Inventor: Edwin T. Chesler, Hamden, Conn.

[73] Assignee: Olin Corporation, New Haven, Conn.

[21] Appl. No.: 342,859

[22] Filed: Jan. 26, 1982

[51] Int. Cl.³ .................. C08G 18/02; C08J 9/16; C08J 9/36

[52] U.S. Cl. .................. 521/49.5; 521/49; 521/137

[58] Field of Search .................. 521/49, 49.5, 137

[56] References Cited

U.S. PATENT DOCUMENTS

| | | |
|---|---|---|
| 2,742,440 | 4/1956 | Stott et al. |
| 2,853,742 | 9/1958 | Dasher |
| 3,298,976 | 1/1967 | Reinhart |
| 3,300,417 | 1/1967 | McElroy |
| 3,326,861 | 6/1967 | Sandridge |
| 3,344,212 | 9/1967 | Francis |
| 3,404,103 | 10/1968 | Matsudaira et al. |
| 3,441,523 | 4/1969 | Dwyer et al. |
| 3,517,414 | 6/1970 | Carson, Jr. |
| 3,531,562 | 9/1970 | Serrano et al. .................. 521/49 |
| 3,607,999 | 9/1971 | Corbett et al. |
| 3,649,920 | 2/1972 | Cear |
| 3,708,440 | 1/1973 | Frulla et al. |
| 3,888,806 | 6/1975 | Kropscoti .................. 521/49.5 |
| 3,928,253 | 12/1975 | Thornton et al. |
| 3,983,087 | 9/1976 | Tucker et al. |
| 4,067,831 | 1/1978 | Wasilczyk |
| 4,108,791 | 8/1978 | Wasilczyk |
| 4,115,298 | 9/1978 | Schneider et al. |
| 4,123,584 | 10/1978 | Brewton |
| 4,138,374 | 2/1979 | Currie |
| 4,143,001 | 3/1979 | Raab et al. |
| 4,159,972 | 7/1979 | Braslaw et al. |
| 4,162,995 | 7/1979 | Sheratte |
| 4,212,774 | 7/1980 | Idel |
| 4,217,422 | 8/1980 | Wasilczyk |
| 4,243,560 | 1/1981 | Balestrini |
| 4,250,222 | 2/1981 | Mavel et al. |
| 4,267,078 | 5/1981 | Lidy et al. |

FOREIGN PATENT DOCUMENTS

| | | | |
|---|---|---|---|
| 43-18478 | 8/1968 | Japan | .................. 521/49 |
| 50-154379 | 12/1975 | Japan | .................. 521/49 |
| 52-28576 | 3/1977 | Japan | .................. 521/49 |
| 55-29550 | 3/1980 | Japan | .................. 521/49 |
| 822446 | 10/1959 | United Kingdom | |
| 2053944 | 2/1981 | United Kingdom | |

OTHER PUBLICATIONS

Ferrigno, "Rigid Plastic Forms", Reinhold Publishing Co., N.Y., 1963, pp. 38-42.

*Primary Examiner*—Allan Lieberman
*Attorney, Agent, or Firm*—William D. Sabo

[57] ABSTRACT

A reaction mixture containing comminuted, flexible polyurethane foam scrap is used in making new flexible polyurethane foam. The process achieves a highly satisfactory utilization of foam scrap, while providing a quality foam product.

23 Claims, No Drawings

RECYCLING OF FLEXIBLE POLYURETHANE FOAM SCRAP

This invention relates to the reutilization of flexible polyurethane foam scrap; and, more particularly, to a process for re-using such foam scrap in making new flexible polyurethane foam and to the resulting product of the process.

Use of flexible polyurethane foam has been increasing dramatically; and with this increase, there has developed a serious problem in disposing of foam waste and undesired foam product. Various approaches have been developed in an effort to reclaim the foam waste or its chemical constituents. In U.S. Pat. Nos. 3,117,940 and 3,404,103, for example, amine compounds are employed in seeking to recover polyols. Illustrative of other techniques which have been used to recover polyols from foam scrap are the following: U.S. Pat. Nos. 2,937,151; 3,300,417; 3,109,824 and 3,441,616. In contrast to these techniques, U.S. Pat. No. 4,243,560 discloses a method which does not involve the use of any added reactive agents or catalysts; polyols are recovered from foam scrap by pyrolyzing the scrap in the absence of air. Yet another approach involves bonding together pieces of foam material to form composite materials. See U.S. Pat. No. 3,517,414.

Now it has been found, in accordance with the invention, that flexible polyurethane foam scrap can be effectively utilized in making new flexible polyurethane foam. This is accomplished by comminuting the scrap to a maximum particle size of less than about 2,000 microns, and then adding it to the reaction mixture to be used in making new foam. It has been discovered that a relatively substantial amount of foam scrap can be incorporated into the reaction mixture without significantly affecting resulting foam properties. Thus, the present invention provides a means for efficiently re-using polyurethane waste product, while yielding new foam with acceptable characteristics. In a preferred embodiment, the foam scrap is flexible, compression-densified polyurethane foam. This latter type of foam scrap is especially useful in making new flexible, compression-densified polyurethane foam.

In preparing the polyurethane foams of the invention, either the so-called "one-shot method" or the "prepolymer technique" may be employed. Any combination of polyols, including polyether polyols and polyester polyols, organic polyisocyanate, foaming agent, catalyst and other reactants capable of forming a flexible polyurethane foam can be employed in carrying out the process of this invention, and the term "polyurethane foam forming reaction mixture" in the specification and claims herein is intended to include any such combination. Typical formulations are described in U.S. Pat. No. 3,072,582, issued Jan. 8, 1963 and Canadian Pat. No. 705,938, issued Mar. 16, 1965.

While, as indicated above, both polyether and polyester polyols can be employed in the practice of this invention, preferred embodiments utilize polyether polyols in the preparation of the polyurethane foam forming reaction mixture. Any suitable polyether polyol may be used for this purpose. These polyether polyols usually have a hydroxyl number less than about 250, and preferably in the range of about 25–175.

The polyether polyols include for example oxyalkylated polyhydric alcohols having a molecular weight range of about 700–10,000, and preferably about 1,000–6,000. These oxyalkylated polyhydric alcohols are generally prepared by reacting, in the presence of an alkaline catalyst, a polyhydric alcohol and an alkylene oxide such as ethylene oxide, propylene oxide, butylene oxide, amylene oxide, epichlorohydrin, and mixtures of these alkylene oxides, using either random or step-wise addition.

Any polyhydric alcohol which is suitable for preparing polyether polyols that are useful in making flexible polyurethane foam may be employed. Illustrative are ethylene glycol, propylene glycol, 2,3-butylene glycol, 1,3-butylene glycol, 1,5-pentane diol, 1,6-hexane diol, glycerol, trimethylolpropane, triethylolpropane, sorbitol, mixtures thereof and the like. If desired, a portion or all of the polyhydric alcohol may be replaced with another compound having at least two reactive hydrogen atoms, such as alkyl amines, alkylene polyamines, cyclic amines, amides, and polycarboxylic acids. It will be recognized that the reactive hydrogen compound can be one containing different functional groups having reactive hydrogen atoms. Mixtures of oxyalkylated polyhydric alcohols are also suitable for use in the process of this invention.

The organic polyisocyanates used in the preparation of the polyurethane foams include toluene diisocyanate, such as the 4:1 mixture or the 65:35 mixture of the 2,4- and 2,6-isomers, ethylene diisocyanate, propylene diisocyanate, methylene-bis-4-phenyl isocyanate, 3,3'-bitoluene-4,4'-diisocyanate, hexamethylene diisocyanate, naphthalene-1,5-diisocyanate, polyphenylene polymethylene isocyanate, mixtures thereof and the like. The preferred organic polyisocyanate is toluene diisocyanate. The amount of isocyanate employed in the process of this invention should be sufficient to provide at least about 0.7 NCO group per hydroxyl group present in the reaction system, which includes the polyol as well as any additive or foaming agent employed. An excess of isocyanate compound may be conveniently employed; however, this is generally undesirable due to the high cost of the isocyanate compounds. It is preferable, therefore, to employ sufficient isocyanate to provide no greater than about 1.25 NCO groups per hydroxyl group, and preferably between about 0.9 and about 1.15 NCO groups per hydroxyl group. The ratio of NCO to OH groups times 100 is referred to as the "index".

The polyurethane foams are prepared in the presence of a foaming agent, reaction catalyst, and preferably a small proportion of a conventional surfactant. The foaming agent employed may be any of those known to be useful for this purpose. Illustrative are water and organic foaming agents containing up to about seven carbon atoms such as the halogenated hydrocarbons, lower molecular weight alkanes, alkenes, ethers and mixtures thereof. Typical halogenated hydrocarbons include, but are not limited to: monofluorotrichloromethane, dichlorofluoromethane, difluorodichloromethane, 1,1,2-trichloro-1,2,2-trifluoroethane, dichlorotetrafluoroethane, ethyl chloride, methylene chloride, chloroform, and carbon tetrachloride. Other useful foaming agents include lower molecular weight alkanes, alkenes and ethers such as methane, ethane, ethylene, propane, propylene, pentane, hexane, heptane, ethyl ether, diisopropyl ether, mixtures thereof, and the like. The amount of foaming agent employed may be varied within a wide range. Generally, however, the halogenated hydrocarbons are employed in an amount from about 1 to about 50 parts by weight per 100 parts by weight of the polyol, and generally water is employed in an amount from about 1.0 to about 6.0 parts by weight per 100 parts by weight of the polyol.

The polyurethane foams are prepared in the presence of a catalytic amount of a reaction catalyst. The catalyst employed may be any of the catalysts known to be useful for this purpose, such as tertiary amines and metallic salts particularly stannous salts, and mixtures thereof. Typical tertiary amines include, but are not limited to, the following: N-ethyl morpholine, N-hydroxyethyl morpholine, triethylene diamine, triethylamine, trimethylamine, trimethylaminoethyl ethanol amine, and the like, and mixtures thereof. Typical metallic salts include, for example, the salts of antimony, tin and iron, e.g., dibutyltin dilaurate, stannous octoate, and the like. Any catalytic proportion of catalyst or catalyst mixture may be employed such as between about 0.1 and about 3.0 parts, and preferably between about 0.2 to about 2.5 parts, per 100 parts by weight of the polyol.

It is preferred in the preparation of the polyurethane foams of the present invention to employ minor amounts of a conventional surfactant in order to further improve the cell structure of the polyurethane foam. Typical of such surfactants are the silicone oils and soaps, and the siloxane-oxyalkylene block copolymers. U.S. Pat. No. 2,834,748 and T. H. Ferrigno, *Rigid Plastic Foams* (New York: Reinhold Publishing Corp., 1963), pages 38–42, disclose various surfactants which are useful for this purpose. Generally up to about 2 parts by weight of the surfactant are employed per 100 parts by weight of the polyol.

Various additives can also be employed to provide different properties, e.g., fillers such as barytes, clay, calcium sulfate, or ammonium phosphate may be added to lower cost. Ingredients such as dyes may be added for color, and fibrous glass, asbestos, or synthetic fibers may be added for strength. In addition, plasticizers, deodorants, antioxidants and flame retardants may be added.

In a particularly preferred embodiment, the foam is a flexible foam which is densified by compression. The compression-densified foams which are prepared according to the invention have a density ranging from about 1.5 to about 15, and preferably from about 1.5 to about 10, pounds per cubic foot. Any convenient method may be utilized to permanently compress and thereby densify the foam. It is preferable to permanently reduce the foam to at least about ¾, and more preferably to between about ⅔ to about 1/10, of its original free-rise volume. Permanent foam compression may be achieved before or after the foam has become fully cured, using any convenient means such as crushing rolls or conveyors. Where the compression operation is carried out after the foam has become fully cured, additional means, such as heat, would ordinarily have to be used in order to permanently reset the foam in its compressed state. On the other hand, such additional means is usually not necessary when the foam is compressed before it has become substantially cured. The latter practice is preferred according to the method of the invention. This preferred practice is described in detail for example in U.S. Pat. No. 3,506,600 to Zocco et al, issued Apr. 14, 1970, and in U.S. Pat. No. 4,252,517 to Milford et al, issued Feb. 24, 1981. The entire disclosures of these two patents are incorporated herein by reference.

An illustrative batch process for permanently densifying the foam by compression comprises placing the foam forming ingredients into a box or mold and allowing the ingredients to inter-react and fully expand into a foam. Before the foam becomes substantially cured, for example within 10 minutes after the expansion is completed, the foam is removed from the mold and compressed to a fraction of its original volume by means of compression rolls or platens. The compression is then removed and the foam allowed to become fully cured. Conveniently, the mold, into which the foam forming reaction mixture is fed, may be of a selected dimension and configuration so that the final foam product can be used as is, or, if desired, after a trimming operation to remove the skin which usually forms on the foam surface. Thus, densified foam mattresses, cushions and the like can be made using a batch process in accordance with the teachings of the invention.

An illustrative continuous process for permanently compressing the foam comprises admixing the foam forming ingredients in a suitable mixing head and feeding the resulting mixture to a moving conveyor having suitable side retaining means to contain the liquid reactants. The side retaining means are necessary until the foam gels sufficiently to support its own weight. A crushing station, comprising for example a pair of crushing rolls, is placed a certain distance downstream from the mixing head, so that the foam will be crushed at a specified crush time, the downstream distance being a function of the speed of the conveyor. A curing oven may be placed downstream from the crushing rolls to speed up the curing of the foam after it has been crushed; and, still farther downstream, a transverse cutter may be installed to cut the continuous flow of densified foam into sections of the desired length. If desired, means may also be provided downstream from the curing oven, for slicing or trimming off portions of the sides or the outer skin of foam, or for slicing the foam into longitudinal sections of the desired thickness. Here again, the foam, cut to the desired dimensions, can be used directly as a rug padding, mattress, cushion, and the like.

According to the invention, the improved process involves including in the foam forming reaction mixture a proportion of comminuted, flexible polyurethane foam scrap. Preferably, this is accomplished by adding the desired amount of comminuted material to a polyol and blending to form a suspension of particles. The polyol is subsequently employed as a polyol reactant in the reaction mixture. The scrap may include any trimmings, shearings, or the like generated during foam cutting operations or any off-grade material which fails to meet production specifications. Any flexible polyurethane foam scrap material may be included in the reaction mixture in making new polyurethane foam in following the process of the invention. Preferably, however, the scrap is derived from flexible foam products prepared from reactants as described hereinabove, and more preferably is obtained during production of flexible, compression-densified foam.

To achieve satisfactory results according to the invention, it is necessary to reduce the foam scrap to particles having a maximum particle size of less than about 2,000 microns. Preferably, the maximum particle size is less than about 1,000 microns, and most preferably less than about 600 microns. In reducing the foam scrap to particulate form, any conventional technique for mechanically reducing the foam scrap to the desired particle size can be suitably employed. It has been found preferable, however, to reduce the foam scrap to a pre-selected size within the range of the invention by cryogenic grinding.

Practicing the method of the present invention, a small proportion of comminuted foam scrap is added to the foam forming reaction mixture. This comminuted material may be added in any proportion which is effective to achieve a foam product having acceptable properties for a particular application. The amount of comminuted material employed ranges generally from about 3 to about 40 parts, by weight, based on 100 parts of total polyol weight. It has been found to be preferable, however, to utilize a proportion ranging from about 5 to about 32 parts, and more preferably from about 8 to about 24 parts, by weight, based on 100 parts of total polyol weight.

Flexible foams prepared in accordance with the principles of the present invention are characterized by favorable physical properties. They exhibit these properties, although they may contain a rather substantial amount of polyurethane foam scrap. As such, there is achieved an efficient utilization of waste foam which would otherwise have to be disposed of or sold with an attendant economic loss. The present invention has further desirability in that it allows new foam to be made at a cost which is lower than what would be encountered in using an all-raw material formulation.

The flexible polyurethane foams made according to the invention are of utility in a wide variety of cushioning applications. The compression-densified foams are particularly useful in making carpet underlayment and foam-carpet laminates.

The following examples are provided to illustrate the invention. In these examples, all parts and percentages are by weight unless otherwise specified.

EXAMPLE 1

A polyurethane foam having a free-rise density of about 1.80 pounds per cubic foot was prepared from the following ingredients in the indicated proportions:

| Ingredients | Parts by Weight |
|---|---|
| Polyol[1] | 100 |
| Water | 3.6 |
| Surfactant[2] | 1.0 |
| Tertiary Amine[3] | 0.2 |
| Stannous octoate[4] (50% solution in dioctyl phthalate) | 0.65 |
| Flame retardant additive[5] | 4.0 |
| Toluene diisocyanate[6], 110 Index | 47.8 |
| Polyurethane foam scrap[7] | 5.0 |

[1] A polyether triol having a molecular weight of 3,000, prepared by KOH catalyzed oxyalkylation of glycerin with propylene oxide.
[2] Commercially available silicone surfactant sold under the designation "Niax L-560" by Union Carbide Corporation.
[3] Commercially available under the designation "Dabco TL", consisting primarily of tertiary amines and dipropylene glycol from Air Products and Chemicals, Inc.
[4] Commercially available under the designation "T-10" from M&T Chemicals, Inc.
[5] Commercially available under the designation "THERMOLIN ® 101" from Olin Corporation.
[6] A mixture of toluene diisocyanate isomers (80:20 mixture of 2,4/2,6-isomers).
[7] Solid particles of flexible, compression-densified polyurethane foam prepared from the above formulation and having a maximum particle size of less than about 2,000 microns.

A free-rise flexible foam was prepared, using standard hand-mix procedures. A foam having the physical properties as set forth in Table I was obtained.

EXAMPLE 2

The identical procedure of Example 1 was followed except that the polyurethane scrap foam had a maximum particle size of less than about 600 microns. A foam having the physical properties as set forth in Table I was obtained.

EXAMPLE 3

The identical procedure of Example 1 was followed except that the polyurethane scrap foam had a maximum particle size of less than about 300 microns. A foam having the physical properties as set forth in Table I was obtained.

EXAMPLE 4

The identical procedure of Example 1 was followed except that 8.0 parts by weight of polyurethane scrap foam having a maximum particle size of less than about 300 microns were used. A foam having the physical properties as set forth in Table I was obtained.

EXAMPLE 5

The identical procedure of Example 1 was followed except that 8.0 parts by weight of polyurethane foam scrap having a maximum particle size of less than about 212 microns were used. A foam having the physical properties as set forth in Table I was obtained.

COMPARATIVE EXAMPLE A

This comparison is provided to demonstrate the acceptability of the foams obtained by incorporation of small proportions of particles of polyurethane foam scrap into the reaction mixture. Thus, in Comparative Example A, the identical formulation of Example 1 was used in making a polyurethane foam as described in that example; however, the formulation did not contain any polyurethane foam scrap.

The foam of Comparative Example A was tested in the same manner as the foams of Examples 1–5. On an overall basis, the foams of Examples 1–5, although containing varying proportions of polyurethane foam scrap, exhibited properties comparable to those of the foam of Comparative Example A. The physical properties of the foam of Comparative Example A are as set forth in Table I.

TABLE I

| Physical Properties | Example 1 | Example 2 | Example 3 | Example 4 | Example 5 | Comparative Example A |
|---|---|---|---|---|---|---|
| Density, pcf | 1.80 | 1.79 | 1.79 | 1.88 | 1.83 | 1.65 |
| Tensile Strength, psi | 14 | 14 | 14 | 18 | 15 | 14 |

TABLE I-continued

| Physical Properties | Example 1 | Example 2 | Example 3 | Example 4 | Example 5 | Comparative Example A |
|---|---|---|---|---|---|---|
| Elongation, % | 193 | 195 | 170 | 247 | 187 | 183 |
| Tear Strength, ppi | 2.2 | 2.4 | 1.7 | 2.0 | 2.0 | 1.7 |
| Air Flow, cfm | 4.0 | 4.5 | 3.6 | 4.5 | 4.5 | 4.0 |
| Compression Force Deflection, psi | | | | | | |
| @ 25% Deflection | 0.41 | 0.40 | 0.45 | 0.40 | 0.42 | 0.47 |
| @ 65% Deflection | 0.81 | 0.74 | 0.78 | 0.74 | 0.75 | 0.75 |
| Compression Set C(T), % | | | | | | |
| @ 50% Defection | 2.3 | 2.3 | 3.0 | 2.9 | 2.6 | 3.3 |
| @ 90% Deflection | 5.2 | 4.9 | 5.8 | 6.1 | 5.7 | 5.6 |

EXAMPLE 6

A polyurethane foam having a free-rise density of about 1.92 pounds per cubic foot was prepared from the following ingredients in the indicated proportions:

| Ingredients | Parts by Weight |
|---|---|
| Polyol[1] | 100 |
| Water | 3.6 |
| Surfactant[2] | 1.0 |
| Tertiary Amine[3] | 0.2 |
| Stannous octoate[4] (50% solution in dioctyl phthalate) | 0.6 |
| Flame retardant additive[5] | 4.0 |
| Toluene diisocyanate[6], 110 Index | 47.8 |
| Polyurethane foam scrap[7] | 16.0 |

[1] A polyether triol having a molecular weight of 3,000, prepared by KOH catalyzed oxyalkylation of glycerin with propylene oxide.
[2] Commercially available silicone surfactant sold under the designation "Niax L-560" by Union Carbide Corporation.
[3] Commercially available under the designation "Dabco TL" consisting primarily of tertiary amines and dipropylene glycol from Air Products and Chemicals, Inc.
[4] Commercially available under the designation "T-10" from M&T Chemicals, Inc.
[5] Commercially available under the designation "THERMOLIN ® 101" from Olin Corporation.
[6] A mixture of toluene diisocyanate isomers (80:20 mixture of 2,4/2,6-isomers).
[7] Solid particles of flexible, compression-densified polyurethane foam prepared from the above formulation and having a maximum particle size of less than about 600 microns.

A free-rise flexible foam was prepared, using standard hand-mix procedures. A foam having the physical properties as set forth in Table II was obtained.

COMPARATIVE EXAMPLE B

This comparison is provided to demonstrate the acceptability of the foam obtained in Example 6 by the incorporation of 16.0 parts, based on 100 parts of polyol, of particles of polyurethane foam scrap into the reaction mixture. Thus, in Comparative Example B, the identical formulation of Example 6 was used in making a polyurethane foam as described in that example. However, the formulation did not contain any polyurethane foam scrap.

The foam of Comparative Example B was tested in the same manner as the foam of Example 6. On an overall basis, the foam of Example 6, although containing 16.0 parts, based on 100 parts of polyol, of polyurethane foam scrap, exhibited properties comparable to those of the foam of Comparative Example B. The physical properties of the foam of Comparative Example B are as set forth in Table II.

TABLE II

| Physical Properties | Example 6 | Comparative Example B |
|---|---|---|
| Density, pcf | 1.92 | 1.65 |
| Tensile Strength, psi | 12.4 | 11.5 |
| Elongation, % | 137 | 123 |
| Tear Strength, ppi | 1.87 | 1.29 |
| Air Flow, cfm | 4.41 | 3.19 |
| Compression Force Deflection, psi | | |
| @ 25% Deflection | 0.36 | 0.49 |
| @ 65% Deflection | 0.71 | 0.79 |
| Compression Set C(T), % | | |
| @ 50% Deflection | 2.65 | 1.97 |
| @ 90% Deflection | 4.63 | 4.29 |

EXAMPLE 7

A polyurethane foam having a free-rise density of about 1.88 pounds per cubic foot was prepared from the following ingredients in the indicated proportions:

| Ingredients | Parts by Weight |
|---|---|
| Polyol[1] | 100 |
| Water | 3.6 |
| Surfactant[2] | 1.0 |
| Tertiary Amine[3] | 0.2 |
| Stannous octoate[4] (50% solution in dioctyl phthalate) | 0.6 |
| Flame retardant additive[5] | 4.0 |
| Yellow pigment No. 4245[6] | 0.4 |
| Toluene diisocyanate[7], 110 Index | 47.8 |
| Polyurethane foam scrap[8] | 8.0 |

[1] A polyether triol having a molecular weight of 3,000, prepared by KOH catalyzed oxyalkylation of glycerin with propylene oxide.
[2] Commercially available silicone surfactant sold under the designation "Niax L-560" by Union Carbide Corporation.
[3] Commercially available under the designation "Dabco TL", consisting primarily of tertiary amines and dipropylene glycol from Air Products and Chemicals, Inc.
[4] Commercially available under the designation "T-10" from M&T Chemicals, Inc.
[5] Commercially available under the designation "THERMOLIN ® 101" from Olin Corporation.
[6] Commercially available from Pigments Dispersions, Inc.
[7] A mixture of toluene diisocyanate isomers (80:20 mixture of 2,4/2,6-isomers).
[8] Solid particles of flexible, compression-densified polyurethane foam prepared from the above formulation and having a maximum particle size of less than about 600 microns.

The above formulation was poured and allowed to foam on a moving conveyor. When bubbles appeared on the surface of the foam, indicating completion of the expansion, the height of the foam bun was 24.5 inches. Within about 5 minutes from the time that the expansion was completed, the bun was passed through rotating crusher conveyors set at as opening of 13 inches. Throughout the foaming and crushing operations, the ambient temperature was about 80° F. After being compressed by the crusher conveyors, the foam was allowed to become fully cured. The resulting foam bun was substantially open-cell. It had a final density of about 2.59 pounds per cubic foot and a final height of 16 inches. A foam having the physical properties as set forth in Table III was obtained.

EXAMPLE 8

The identical procedure of Example 7 was followed except that a foam was prepared by crushing as to obtain a final density of 3.53 pounds per cubic foot. The foam had the physical properties as set forth in Table III.

COMPARATIVE EXAMPLE C

This comparison is provided to demonstrate the acceptability of the compression-densified foams obtained in Examples 7 and 8 by the incorporation of 8.0 parts, based on 100 parts of polyol, of particles of flexible, compression-densified polyurethane foam scrap in the reaction mixture. Thus, in Comparative Example C, the identical formulation of Example 7 was used in making a polyurethane foam as described in that example. However, the formulation did not contain any polyurethane foam scrap.

The foam of Comparative Example C was tested in the same manner as the foams of Examples 7 and 8. On an overall basis, the foams of Examples 7 and 8, although containing 8.0 parts, based on 100 parts of polyol, of polyurethane foam scrap, exhibited properties comparable to those of the compression-densified foam of Comparative Example C. The physical properties of the foam of Comparative Example C are as set forth in Table III.

TABLE III

| Physical Properties | Example 7 | Example 8 | Comparative Example C |
|---|---|---|---|
| Density, pcf | 2.45 | 3.68 | 2.45 |
| Tensile Strength, psi | 20.4 | 26.6 | 19.4 |
| Elongation, % | 137 | 82 | 147 |
| Tear Strength, ppi | 1.90 | 2.17 | 2.04 |
| Air Flow, cfm | 1.14 | 0.55 | 1.23 |
| Compression Force Deflection, psi | | | |
| @ 25% Deflection | 0.51 | 0.71 | 0.50 |
| @ 65% Deflection | 1.48 | 2.94 | 1.42 |
| Compression Set C(T), % | | | |
| @ 50% Deflection | 6.00 | 4.81 | 5.95 |
| @ 90% Deflection | 10.3 | 10.07 | 9.39 |

What is claimed is:

1. In a process for preparing a flexible polyurethane foam from a foam forming reaction mixture comprising a polyol, an organic polyisocyanate, a foaming agent and a reaction catalyst, the improvement comprising blending in said reaction mixture a proportion of comminuted, flexible polyurethane foam scrap having a maximum particle size of less than about 600 microns to form a suspension in said reaction mixture, said proportion of scrap being from about 3 to about 40 parts, by weight, based on 100 parts of total polyol weight.

2. The process of claim 1, wherein said polyol is a polyether polyol.

3. The process of claim 2, wherein said reaction mixture further comprises a surfactant.

4. The process of claim 3, wherein said proportion ranges from about 5 to about 32 parts.

5. The process of claim 4, wherein said proportion ranges from about 8 to about 24 parts.

6. The process of claim 3, wherein said polyether polyol is an oxyalkylated polyhydric alcohol having a molecular weight of about 1,000–6,000 and said organic polyisocyanate is toluene diisocyanate.

7. The process of claim 6, wherein said polyether polyol is oxypropylated glycerin and said reaction mixture comprises water and a catalyst mixture of an amine and a stannous salt.

8. The process of claim 3, wherein said foam scrap is flexible, compression-densified polyurethane foam having a density within the range from about 1.5 to about 15 pounds per cubic foot.

9. The process of claim 8, wherein said foam scrap is employed in a proportion ranging from about 8 to about 24 parts, by weight, based on 100 parts of total polyol weight.

10. The process of claim 9, wherein said polyether polyol is an oxyalkylated polyhydric alcohol having a molecular weight of about 1,000–6,000 and said organic polyisocyanate is toluene diisocyanate.

11. The process of claim 10, wherein said polyether polyol is oxypropylated glycerin and said reaction mixture comprises water and a catalyst mixture of an amine and a stannous salt.

12. In a process for preparing a flexible, compression-densified polyurethane foam having a density within the range from about 1.5 to about 15 pounds per cubic foot prepared by (a) placing a polyurethane foam forming reaction mixture in a reaction zone and allowing the mixture to rise freely, thereby forming a partially cured cellular material, said reaction mixture being comprised of a polyol, an organic polyisocyanate, a foaming agent and a reaction catalyst;

(b) applying a compressive force to the partially cured cellular material after completion of the rise, thereby;

(c) reducing the volume of the partially cured cellular material to between about ¾ and about 1/10 of its original volume; and (d) removing the compressive force and completing the cure of the compressed cellular material;

the improvement comprising blending in said reaction mixture a proportion of comminuted, flexible polyurethane foam scrap having a maximum particle size of less than about 600 microns to form a suspension in said reaction mixture, said proportion of scrap being from about 3 to 40 parts, by weight, based on 100 parts of total polyol weight.

13. The process of claim 12, wherein said polyol is a polyether polyol.

14. The process of claim 13, wherein said reaction mixture further comprises a surfactant.

15. The process of claim 14, wherein said foam scrap is employed in a proportion ranging from about 8 to about 24 parts, by weight, based on 100 parts of total polyol weight.

16. The process of claim 15, wherein said foam scrap is flexible, compression-densified polyurethane foam having a density within the range from about 1.5 to about 15 pounds per cubic foot.

17. The process of claim 16, wherein said polyether polyol is an oxyalkylated polyhydric alcohol having a molecular weight of about 1,000–6,000 and said organic polyisocyanate is toluene diisocyanate.

18. The process of claim 17, wherein said polyether polyol is oxypropylated glycerin and said reaction mixture comprises water and a catalyst mixture of an amine and a stannous salt.

19. A polyurethane foam product prepared according to the process of claim 1.

20. A polyurethane foam product prepared according to the process of claim 8.

21. A polyurethane foam product prepared according to the process of claim 11.

22. A polyurethane foam product prepared according to the process of claim 12.

23. A polyurethane foam product prepared according to the process of claim 18.

* * * * *